United States Patent
Marchildon et al.

(10) Patent No.: US 9,650,090 B2
(45) Date of Patent: May 16, 2017

(54) DEFORMABLE GUIDE RAIL AND TRACK SYSTEM COMPRISING THE SAME

(71) Applicant: SOUCY INTERNATIONAL INC., Drummondville, Quebec (CA)

(72) Inventors: Louis-Frederic Marchildon, Drummondville (CA); Patrick L'Herault, St-Majorique de Grantham (CA)

(73) Assignee: SOUCY INTERNATIONAL INC., Drummondville (CA)

( * ) Notice: Subject to any disclaimer, the term of this patent is extended or adjusted under 35 U.S.C. 154(b) by 0 days.

(21) Appl. No.: 14/713,795

(22) Filed: May 15, 2015

(65) Prior Publication Data

US 2015/0329155 A1    Nov. 19, 2015

Related U.S. Application Data

(60) Provisional application No. 61/993,434, filed on May 15, 2014.

(51) Int. Cl.
| | |
|---|---|
| *B62D 55/10* | (2006.01) |
| *B62D 55/104* | (2006.01) |
| *B62D 55/065* | (2006.01) |
| *B62D 55/14* | (2006.01) |
| *B62D 55/04* | (2006.01) |

(52) U.S. Cl.
CPC .......... *B62D 55/10* (2013.01); *B62D 55/104* (2013.01); *B62D 55/04* (2013.01); *B62D 55/065* (2013.01); *B62D 55/14* (2013.01)

(58) Field of Classification Search
CPC ...... B62D 55/104; B62D 55/10; B62D 55/04; B62D 55/065
See application file for complete search history.

(56) References Cited

U.S. PATENT DOCUMENTS

| | | | | |
|---|---|---|---|---|
| 2,449,421 | A * | 9/1948 | Slemmons | B62D 55/253 305/167 |
| 2,453,750 | A * | 11/1948 | Kamlookhine | B62D 55/305 305/130 |
| 2,934,383 | A * | 4/1960 | Barnes | B62D 55/08 305/123 |
| 3,613,811 | A * | 10/1971 | Brandli | B62D 55/108 180/193 |
| 4,546,842 | A * | 10/1985 | Yasui | B62D 55/07 180/193 |

(Continued)

*Primary Examiner* — Kip T Kotter
(74) *Attorney, Agent, or Firm* — BCF LLP

(57) ABSTRACT

A guide rail configured to be mounted in a track system used to support and drive an endless track comprises at least one resilient deformable portion which is rigid enough to guide the track during normal operation of the track system but which is flexible enough to temporarily deform under the impact of hard or immovable obstacles. The at least one resilient deformable portion of the guide rail can be made thinner than the remaining of the guide rail, can be made of a material more flexible than the material of the remaining of the guide rail, or both. During operation of the vehicle on which the track system is mounted, the at least one resilient deformable portion of the guide rail will allow the track system to absorb at least some shocks and vibrations without transmitting them to the vehicle and its operator.

23 Claims, 14 Drawing Sheets

(56) References Cited

U.S. PATENT DOCUMENTS

| | | | | |
|---|---|---|---|---|
| 4,898,256 | A * | 2/1990 | Lehner | A61G 5/061 |
| | | | | 180/8.2 |
| 2004/0188160 | A1 * | 9/2004 | Yoshihara | B62D 55/07 |
| | | | | 180/190 |
| 2010/0231034 | A1 * | 9/2010 | Kanzler | B62D 55/10 |
| | | | | 305/126 |
| 2010/0276990 | A1 * | 11/2010 | Zuchoski | B62D 55/065 |
| | | | | 305/130 |
| 2012/0322597 | A1 * | 12/2012 | Hundegger | B27B 25/04 |
| | | | | 474/148 |

* cited by examiner

DEFORMABLE GUIDE RAIL AND TRACK SYSTEM COMPRISING THE SAME

CROSS-REFERENCE TO RELATED APPLICATIONS

The present patent application claims the benefits of priority of U.S. Provisional Patent Application No. 61/993,434, entitled "Deformable Guide Rail and Track System Comprising the Same", and filed at the United States Patent and Trademark Office on May 15, 2014, the content of which is incorporated herein by reference.

FIELD OF THE INVENTION

The present invention generally relates to track systems and track assemblies used to support and drive endless track to propel a vehicle. The present invention particularly relates, but is not limited, to track systems and track assemblies for use on recreational vehicles such as, but not limited to, snowmobiles, all-terrain vehicles (ATVs), utility-terrain vehicles (UTVs) and side-by-side vehicles (SSVs).

BACKGROUND OF THE INVENTION

Many recreational vehicles such as snowmobiles and ATVs are provided with track systems for propelling them.

In the case of a snowmobile, the track system forms an integral part of the vehicle and the track system is fully integrated in the overall construction of the vehicle.

In the case of an ATV (UTV or SSV), the track systems are often used in replacement of the wheels normally used for propelling the vehicle.

Still, whether the vehicle is a snowmobile or an ATV, the track system is configured to support and drive an endless track typically, but not necessarily, made from elastomeric material. Hence, the vast majority of track systems comprise at least one drive wheel (e.g. a sprocket wheel), a more or less complex support structure, at least one idler wheel and road wheels.

In these track systems, the idler wheels and the road wheels are often mounted to the lower portion of the support structure that comprises, or is configured as, a guide rail for further guiding the track as the track is driven about the track system.

Recreational vehicles are often used and operated in off-road environments where they encounter hard and/or immovable obstacles such as rocks, roots, etc. When the track systems of these vehicles encounter such obstacles, they must overcome them. However, overcoming hard and/or immovable obstacles generally involves shocks and other vibrations that are transmitted to the vehicle and ultimately to its operator.

There have been attempts in the past to reduce the transmission of vibration and shocks to the vehicles and its operator. For instance, in U.S. Patent Application Publication No. 2012/0242141, a track system for use as a wheel replacement on a wheeled vehicle is disclosed. In this track system, the support structure comprises a suspension which allows the track system to absorb some shocks and vibrations.

Still, most past attempts to reduce the transmission of vibrations and shocks to the vehicle and its operator imply bulky or otherwise complex arrangements that add costs and complexity to the track system. Hence, there is a need for a track system that can mitigate at least some of the aforementioned shortcomings.

SUMMARY OF THE INVENTION

The aforementioned shortcomings are generally mitigated by a track system which guide rail (or guide rails) comprises at least one deformable portion which is rigid enough to guide the track during normal operation of the track system but which is also flexible enough to temporarily deform or deflect under the impact of hard or immovable obstacles.

The at least one resilient deformable portion of the guide rail allows the track system to absorb at least some vibrations and shocks without transmitting them to the vehicle and its operator.

The guide rail is generally located on the lower portion of the support structure in order to guide, alone or in cooperation with road wheels, the lower run of the endless track, which is the portion of the track generally contacting the ground surface.

The guide rail generally comprises at least one resilient deformable portion which is rigid enough to guide the track during normal operation of the track system but which is also flexible enough to temporarily and resiliently deform under the impact of hard and/or immovable obstacles (e.g. a rock, a root, etc.).

The support structure of the track system, or the guide rail itself, generally comprises at least one deflection space above the at least one resilient deformable portion in order for the at least one resilient deformable portion to be free to deform and deflect upwardly upon impact. In that sense, the amount of deflection that the at least one resilient deformable portion can be allowed to sustain can be limited by the size (or height) of the space provided above it.

Depending on its size, i.e. length, the guide rail can comprise more than one resilient deformable portion. For instance, a guide rail in accordance with the principles of the invention comprised in the track system of a snowmobile could comprise several longitudinally spaced apart resilient deformable portions. However, a guide rail in accordance with the principles of the invention comprised in the track system for use as a wheel-replacement on an ATV could comprise a single resilient deformable portion.

Also, even though the at least one resilient deformable portion is generally mainly configured for vertical deformation or deflection, by virtue of its resiliency, the at least one resilient deformable portion could also be able to deform or deflect laterally. However, the at least one resilient deformable portion should be more deformable or deflectable in the vertical direction than in the lateral direction as the at least one resilient deformable portion is still part of the guide rail which function is to guide the track.

In some embodiments of the guide rail in accordance with the principles of the invention, the at least one resilient deformable portion is a portion which is thinner than the remaining of the guide rail.

In some other embodiments of the guide rail in accordance with the principles of the invention, the at least one resilient deformable portion is a portion which is made of a material which is more flexible than the material from which the remaining of the guide rail is made.

In still some other embodiments of the guide rail in accordance with the principles of the invention, the at least one resilient deformable portion could be mounted to the guide rail via mechanical joints (e.g. brackets) which further allow vertical and possibly lateral displacements of the at least one resilient deformable portion.

In still further other embodiments of the guide rail in accordance with the principles of the invention, the at least one resilient deformable portion could combine a thinner portion, a portion made from a more flexible material and/or mechanical joints. Understandably, the exact configuration of the at least one resilient deformable portion would depend on the amount of desired shock and vibration absorption on the size of the vehicle and/or possibly on other factors as well.

Understandably, a track system comprising a guide rail comprising one or more resilient deformable portions in accordance with the principles of the present invention will generally absorb more vibrations and shocks while reducing the amount of vibrations and shocks transmitted to the vehicle and its operator.

In an aspect of the invention, the track system comprises a drive wheel, a support structure comprising a guide rail, a front idler wheels pivotally mounted to the support frame, a rear idler wheels pivotally mounted to the support frame, at least one road wheel pivotally mounted to the support structure. The guide rail comprises at least one resilient deformable portion configured to temporarily deform with respect to relief of the ground and the endless track is disposed about the wheels.

In another aspect of the invention, the resilient deformable portion is rigid enough to guide an endless track during normal operation of the track system and is flexible enough to temporarily and resiliently deform with respect to relief of the ground.

In a further aspect of the invention, a guide rail for a track system comprises at least one resilient deformable portion which temporarily deform with respect to the relief of the ground. The guide rail further may comprise a front portion, a rear portion and a middle portion. The middle portion may comprise the resilient deformable portion of the guide rail. The guide rail may comprise at least two resilient deformable portions.

Other and further aspects and advantages of the present invention will be obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

The above and other aspects, features and advantages of the invention will become more readily apparent from the following description, reference being made to the accompanying drawings in which.

DETAILED DESCRIPTION OF THE PREFERRED EMBODIMENT

A novel deformable guide rail and a track system comprising the same will be described hereinafter. Although the invention is described in terms of specific illustrative embodiments, it is to be understood that the embodiments described herein are by way of example only and that the scope of the invention is not intended to be limited thereby.

Figure 1:
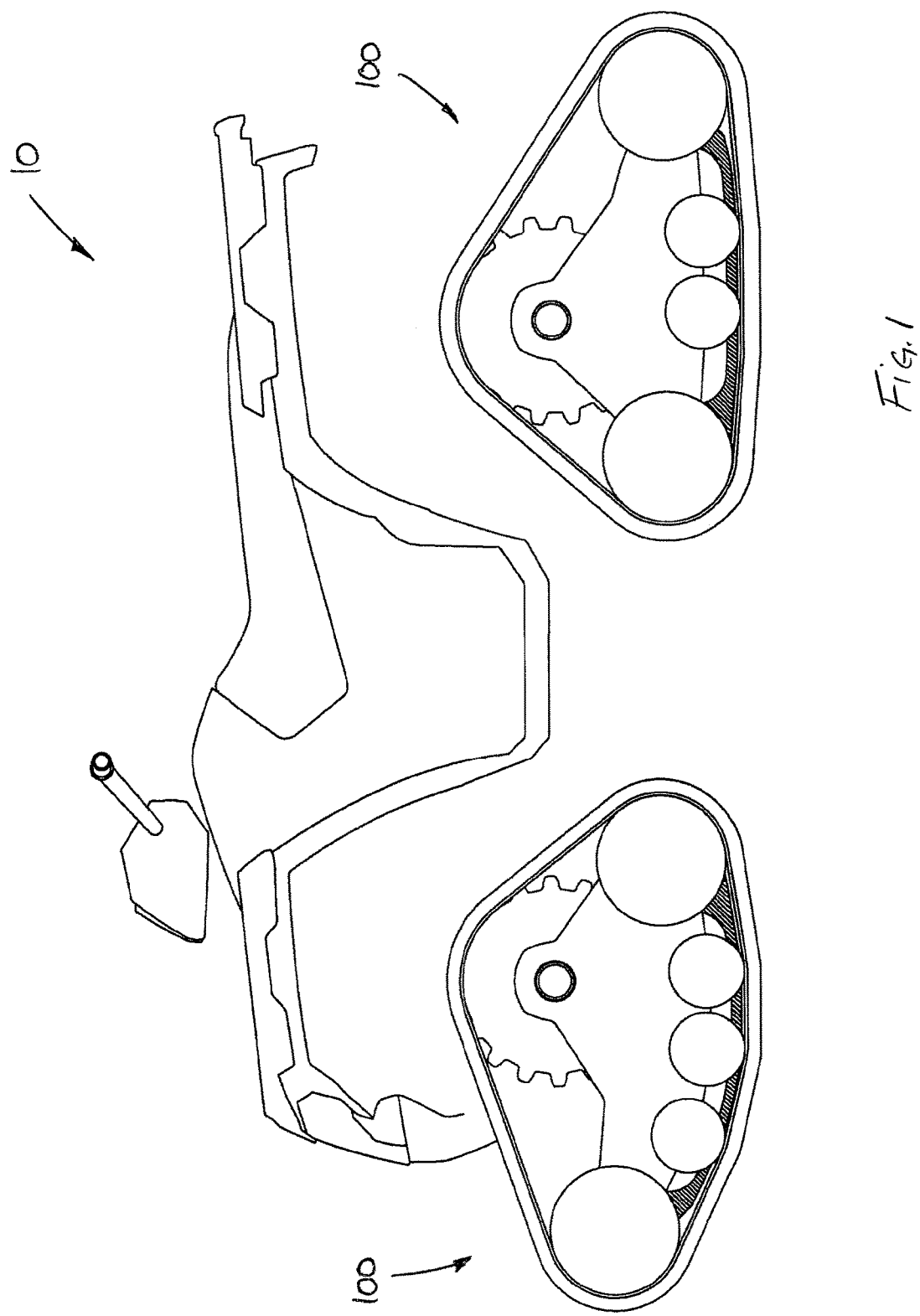
FIG. 1 is a side view of an exemplary ATV equipped with track systems comprising embodiments of guide rails in accordance with the principles of the present invention.

Referring first to FIG. 1, a normally wheeled recreational vehicle 10 (e.g. an ATV) is shown equipped with front and rear track systems 100 in place of its normal wheels (not shown). Understandably, even though an ATV is shown, the track systems 100 could be mounted on other types of recreational vehicles, including, but not limited to, UTVs and SSVs.

Figure 2:
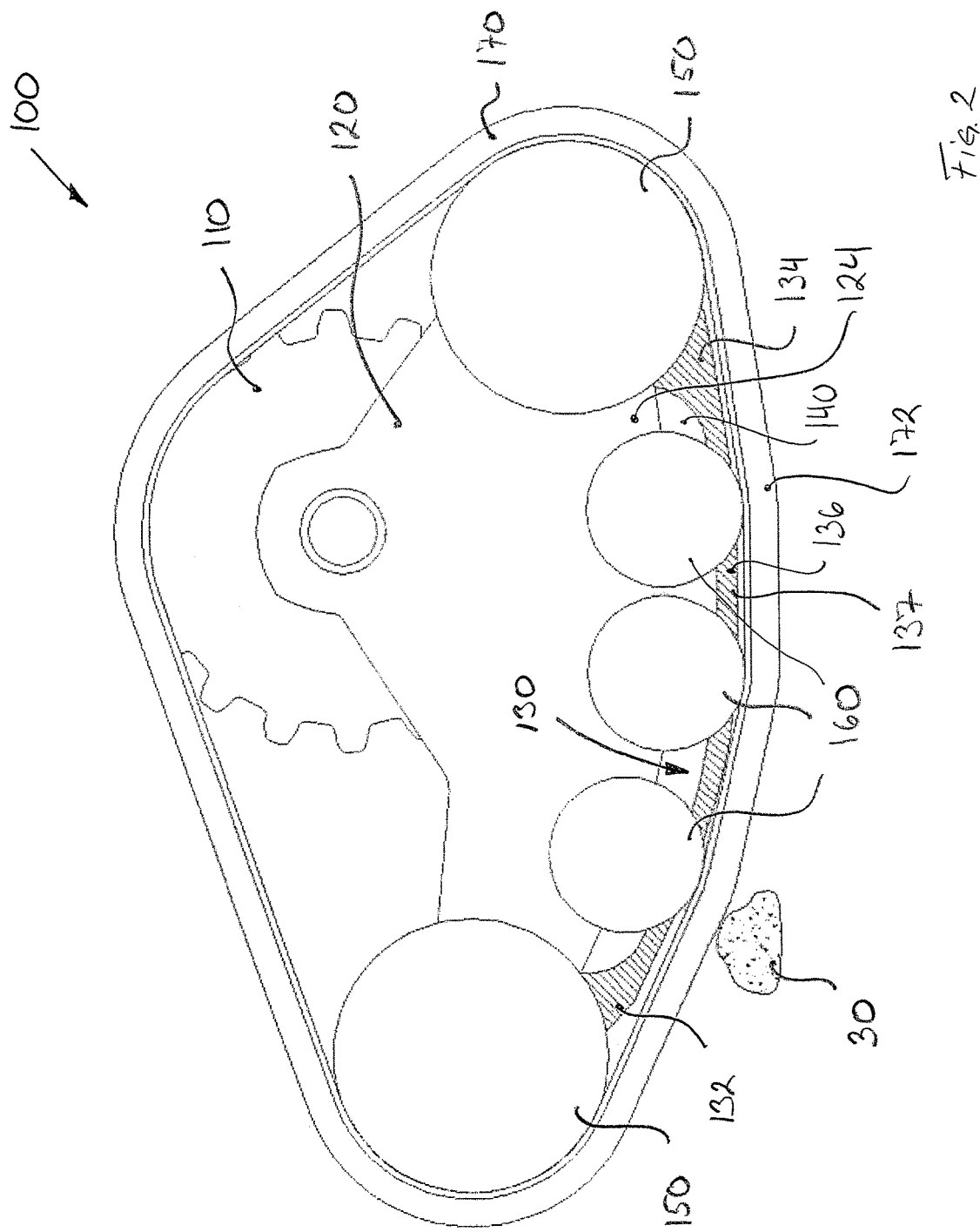
FIG. 2 is a side view of the front left track system of FIG. 1, the guide rail being in neutral position.

Referring now to FIG. 2, the front left track system 100 is shown in greater details.

Track system 100 generally comprises a drive wheel 110 (e.g. a sprocket wheel) configured to be mounted to the vehicle 10, a support structure 120 including a guide rail 130, idler wheels 150 pivotally mounted at the front end and at the rear end of the support structure, road wheels 160 pivotally mounted to the support structure 120 along its length, and an endless track 170 disposed about the wheels 110, 150 and 160 and guide rail 130.

In the present embodiment, the endless track 170 is made from reinforced elastomeric material as in known in the art.

Still referring to FIG. 2, the guide rail 130 is generally located at the lower portion 124 of the support structure 120 such as to guide the lower run 172 of the endless track 170, that is the portion of the track 170 extending between the front and rear idler wheels 150 and facing the ground surface.

Though the guide 130 could be made integral with the support structure 120, the guide rail 130 is generally distinct from yet mounted to the support structure 120 in order to facilitate its replacement. The guide rail 130 is indeed a wear component.

In the present embodiment, the guide rail 130 is mounted to the lower portion 124 of the support structure 120 and further comprises a front portion 132, a rear portion 134 and a middle portion 136. In the present embodiment, the middle portion 136 is a deformable resilient portion 137 which is configured to temporarily deform or deflect under the impact of a hard and/or immovable obstacle.

Figure 3:
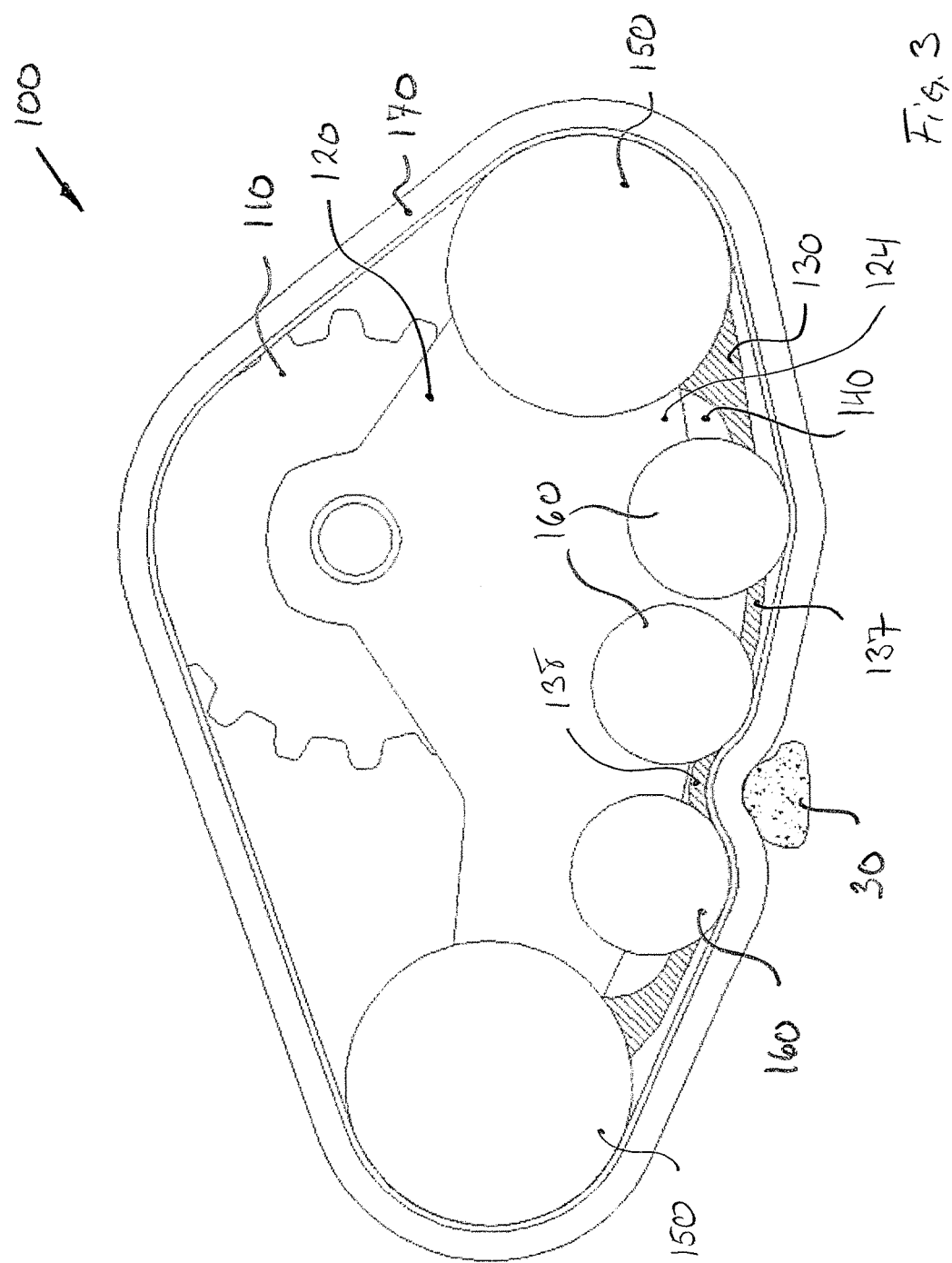
FIG. 3 is another side view of the front left track system of FIG. 1, the guide rail being in deflected position.
Figure 4:
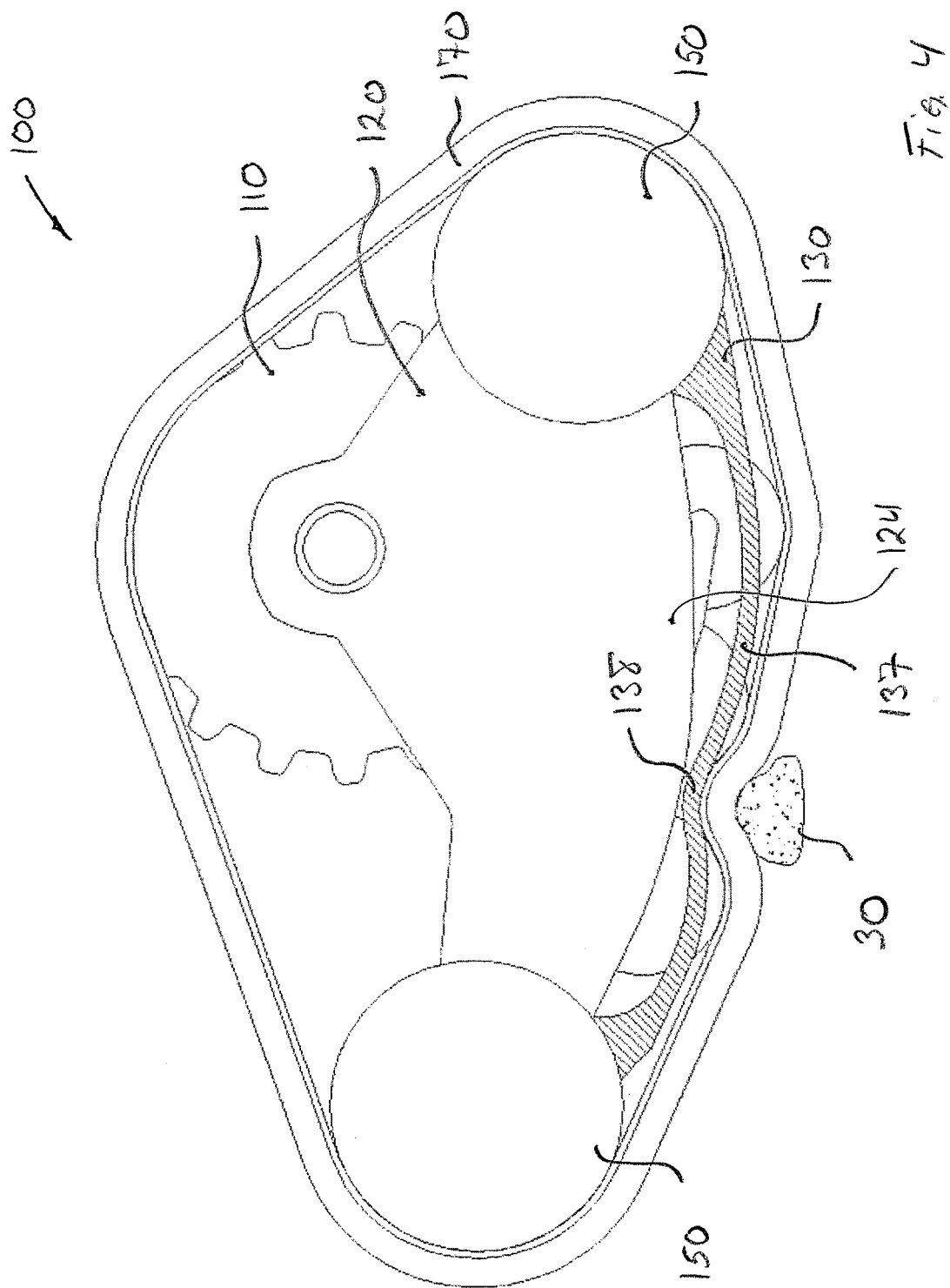
FIG. 4 is a fragmentary side view of the front left track system of FIG. 1, the guide rail being in deflected position and the external road wheels being removed.

In that sense, referring now to FIGS. 3 and 4, when the track system 100 encounters a hard obstacle such as rock 30, the track system 100 will first slightly rise to overcome the rock 30 and as the rock 30 reaches the deformable portion 137, the deformable portion 137 will deflect upwardly (at 138) to absorb at least part of the impact.

As can be seen in FIGS. 3 and 4, the amplitude of the upward deflection 138 of the deformable portion 137 is limited by the size or height of the space 140 present between the portion 137 and the lower portion 124 of the support structure 120.

The larger the height 140, the larger the amplitude of the possible upward deflection by the deformable portion 137. However, height of the space 140 should typically take into account the capacity of the deformable portion 137 to resiliently deflect. Understandably, if the height of the space 140 is too large, the deformable portion 137 could be allowed to deflect beyond its elastic threshold and started to permanently deform. A permanently deformed deformable portion 137 would no longer be able to properly guide the track 170.

As the track system 100 further travels over the rock 30, the deflection 138 of the portion 137 will move toward the rear portion 134 of the guide rail 130 until the rock 30 is located underneath the rear portion 134.

Understandably, since the deformable portion 137 of the guide rail 130 absorbs at least part of the impact caused by the rock 30, less vibrations and shocks are transmitted to the vehicle 10 and its operator (not shown).

As shown in FIGS. 2 to 4, in the present embodiment, the deformable portion 137 is made from the same material as the rest of the guide rail 130 but is made thinner than the rest of the guide rail 130. Understandably, the thinner deformable portion 137 is more easily deflected than the remaining of the guide rail 130.

Figure 13:
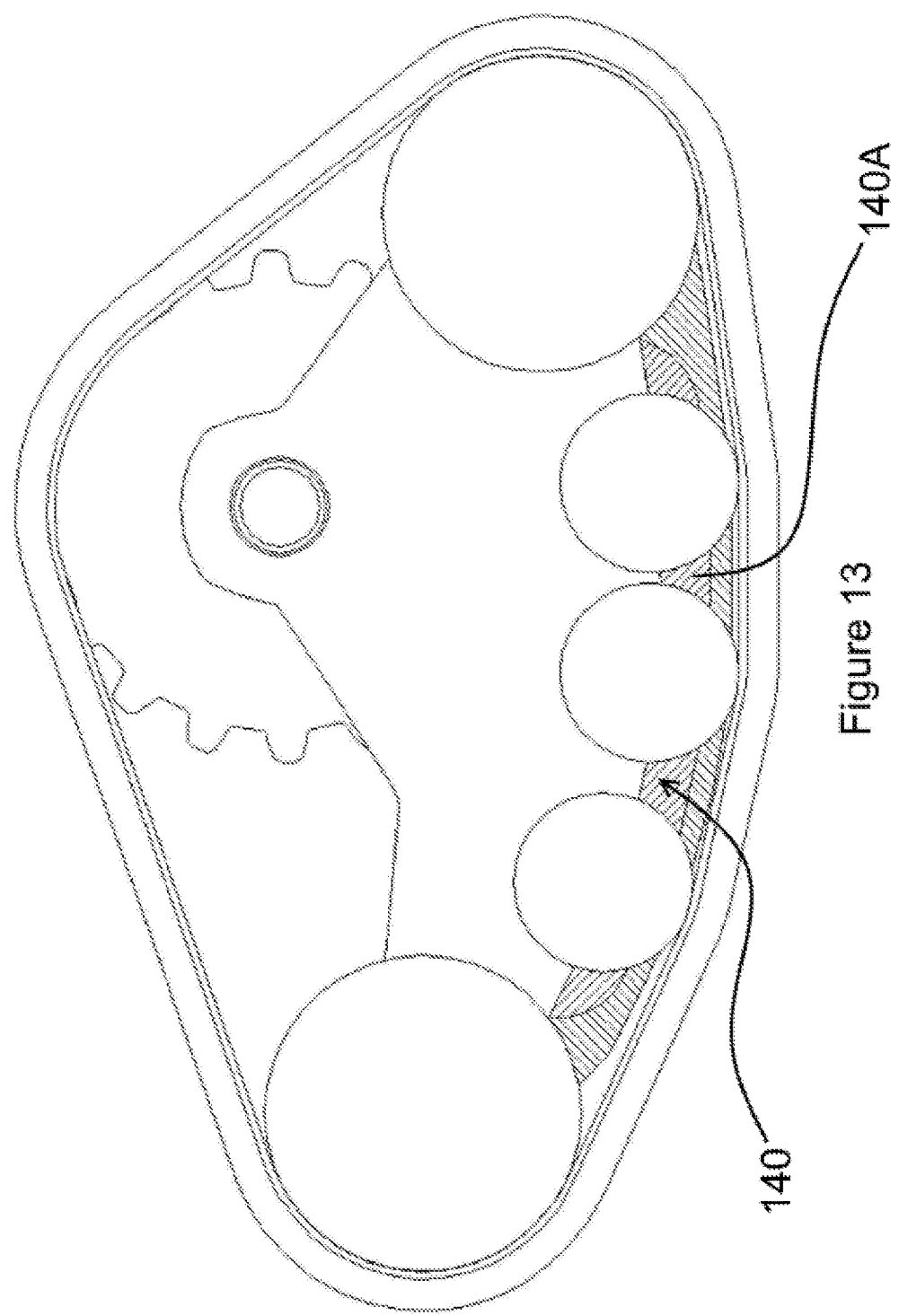
FIG. 13 is a side view of a front left track system of an exemplart ATV, the track system comprising another embodiment of guide rails in accordance with the principles of the present invention, the guide rail being in neutral position.

In the present embodiment, the space 140 between the deformable portion 137 and the support structure 120 is empty. However, in other embodiments and as illustrated in FIG. 13, this space 140 could be partially or completely filled with a resilient material 140A such as elastomeric material or with a polymeric material such as polymeric foam. In such embodiments, the filling resilient material 140A may contribute to further absorb vibrations and shocks.

In other embodiments, the deformable portion 137 could be made of a different and generally more flexible material than the rest of the guide rail 130. In such embodiments, depending on the material of the deformable portion 137, the latter may or may not be made thinner than the rest of the guide rail 130.

Different types of resilient material could be used for the deformable portion 137 (and possibly for the guide rail 130).

For instance, thermoplastic polymers such as polyethylene (e.g. ultra high molecular weight high density polyethylene (UHMW-HDPE)), polyacetal, polyamide (e.g. Nylon), thermoset polymers such as polyurethane, and elastomers such as polyurethane, could be used of the deformable portion 137.

Furthermore, these materials could be further reinforced with glass and/or carbon fibers, with ferrous materials, and/or with non-ferrous materials.

Understandably, the above list of possible material is only illustrative. Other materials could be used.

Referring now to FIGS. 5 to 10, various mechanical mounting arrangement for the guide rail 130 are shown.

Figure 5:
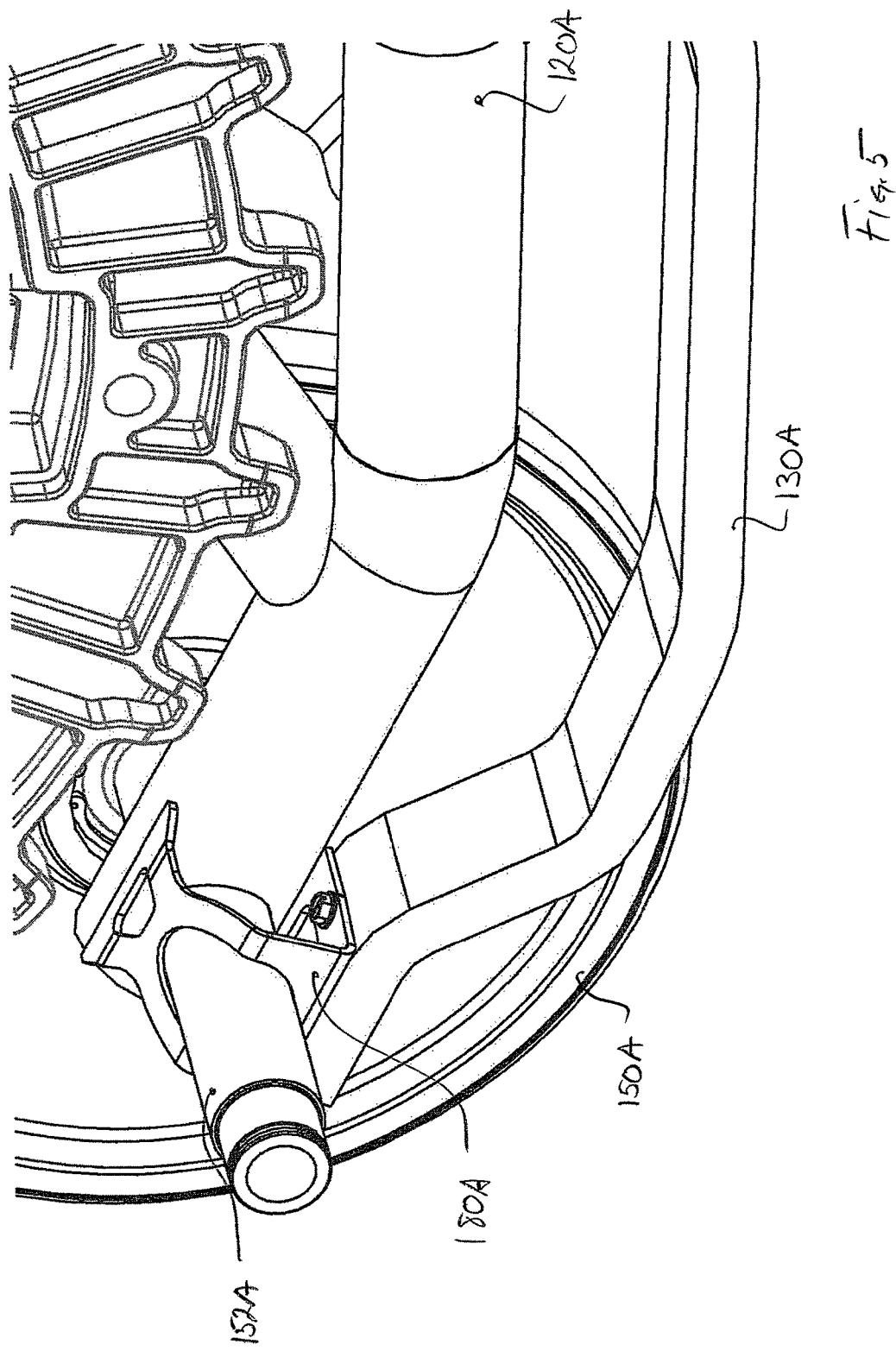
FIG. 5 is a fragmentary enlarged side perspective view of a track system comprising another embodiment of a guide rail in accordance with the principles of the present invention.
Figure 6:
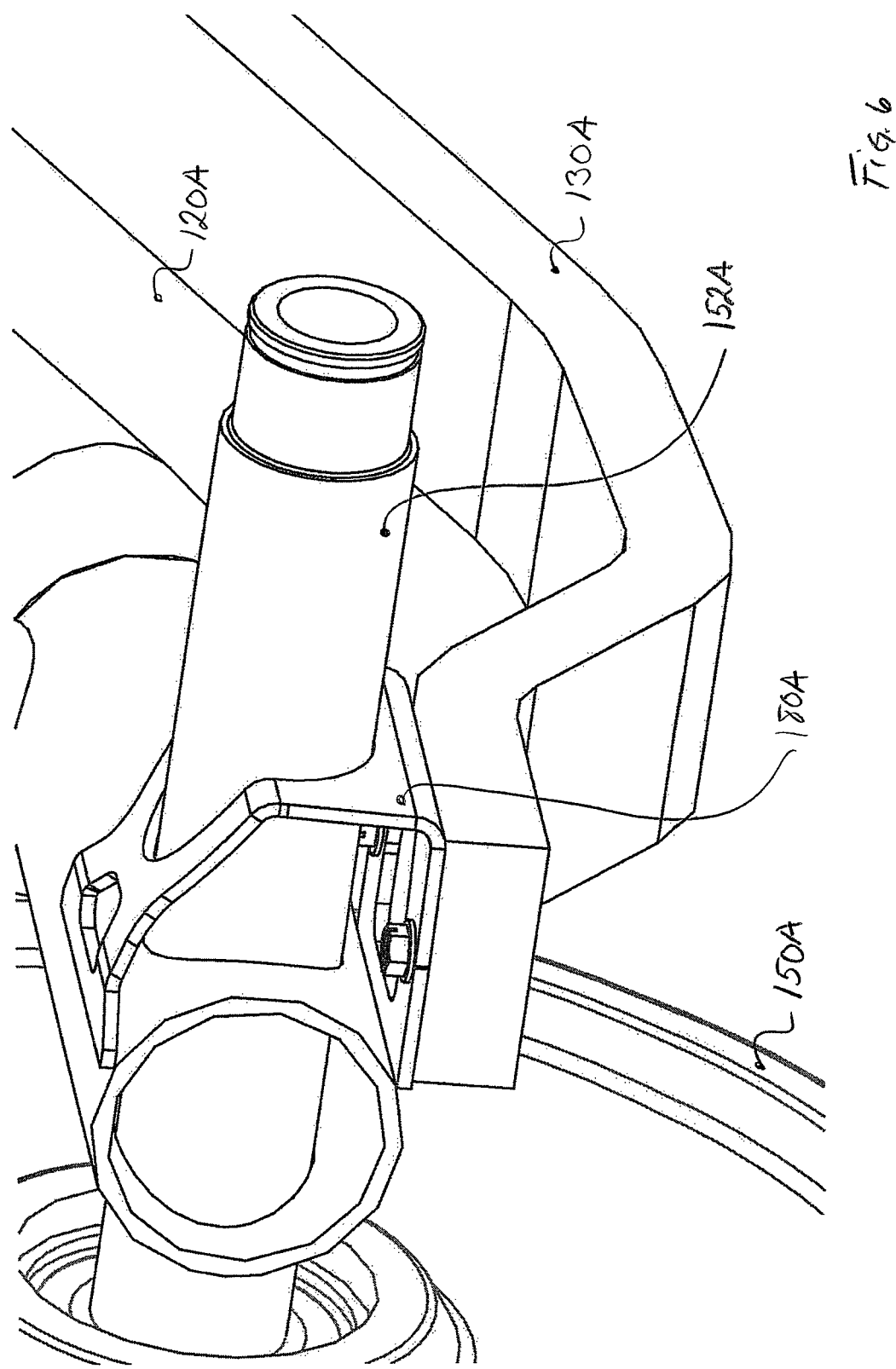
FIG. 6 is another fragmentary enlarged side perspective view of the track system comprising the guide rail of FIG. 5.

In the embodiment shown in FIGS. 5 and 6, the guide rail 130A is mounted to the support structure 120A via a bracket 180A mounted to the axle 152A of the front (or rear) idler wheel 150A.

Figure 7:
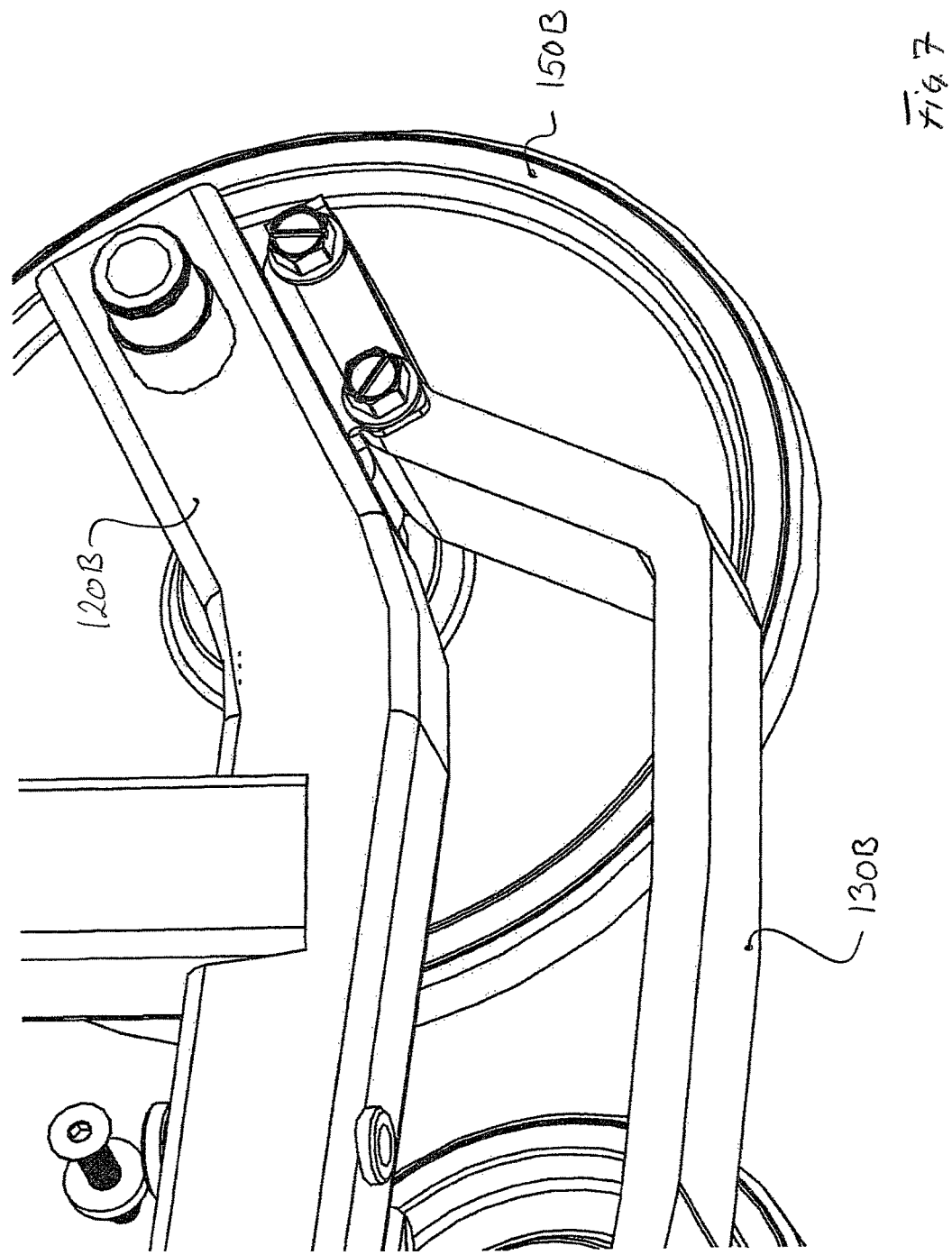
FIG. 7 is a fragmentary enlarged side perspective view of a track system comprising another embodiment of a guide rail in accordance with the principles of the present invention.
Figure 8:
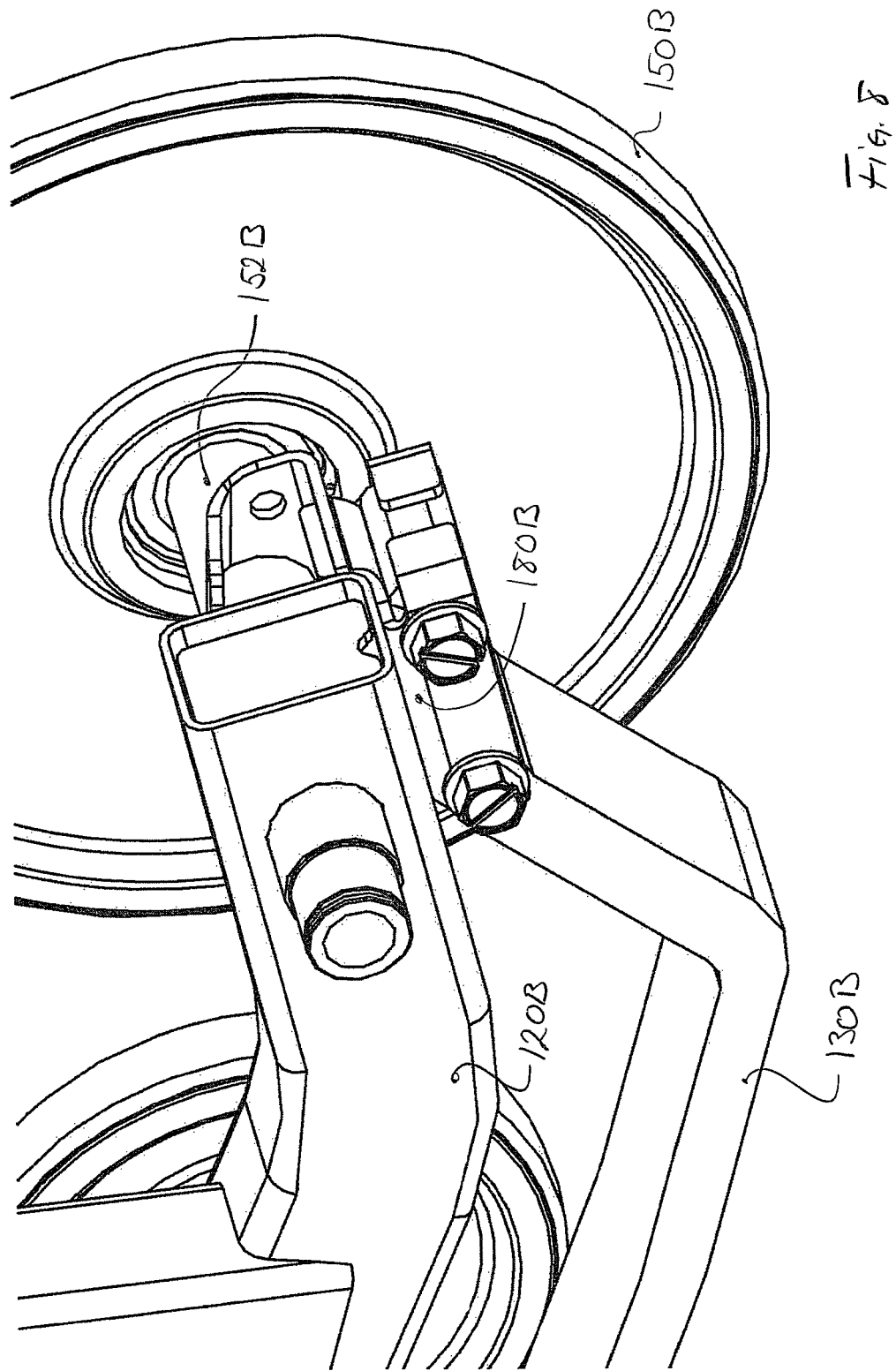
FIG. 8 is a fragmentary enlarged side perspective view of the track system comprising the guide rail of FIG. 7.

Similarly, in the embodiment shown in FIGS. 7 and 8, the guide rail 130B is mounted to the support structure 120B via a different bracket 180B mounted to the axle 152B of the front (or rear) idler wheel 150B.

Figure 9:
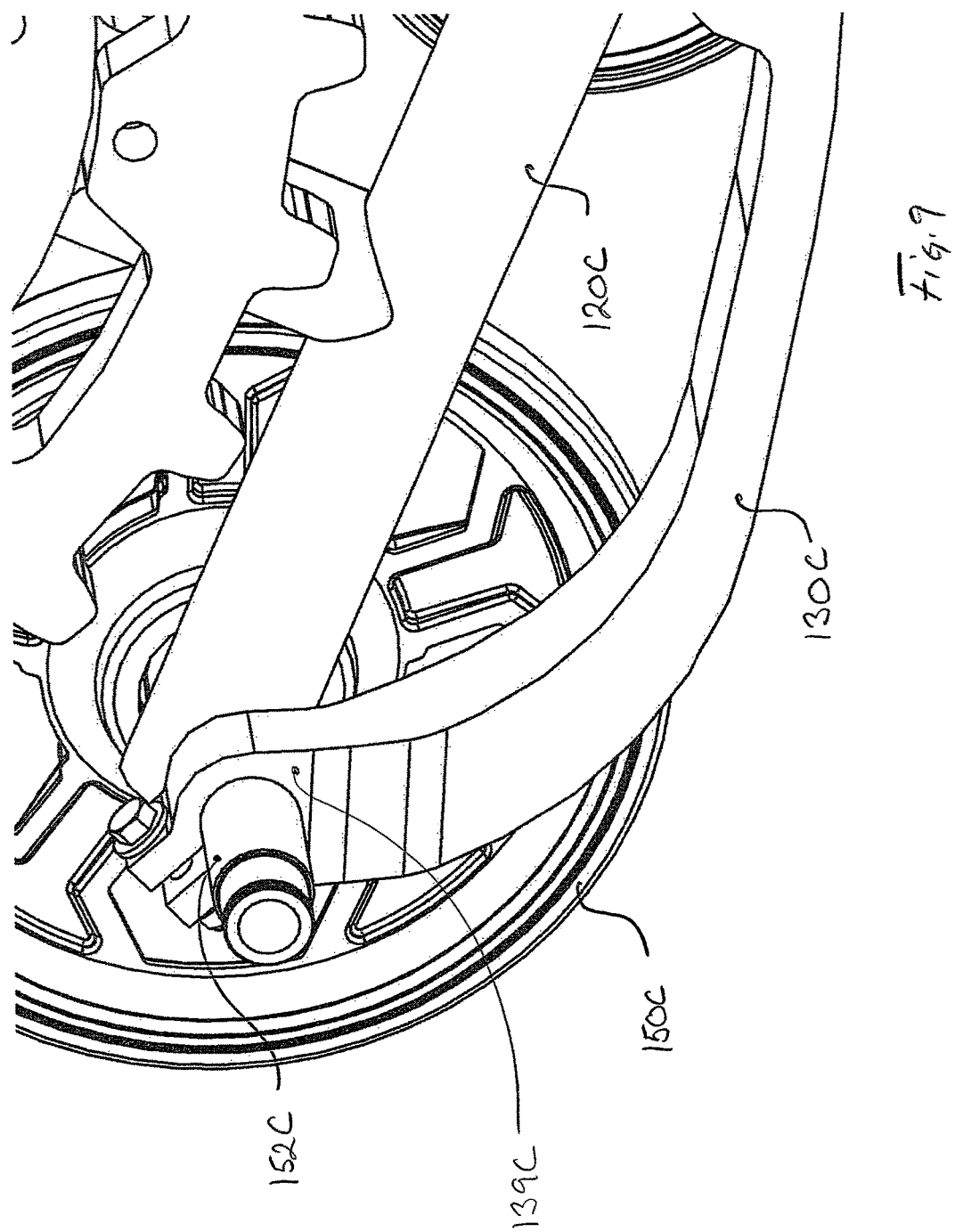
FIG. 9 is a fragmentary enlarged side perspective view of a track system comprising another embodiment of a guide rail in accordance with the principles of the present invention.
Figure 10:
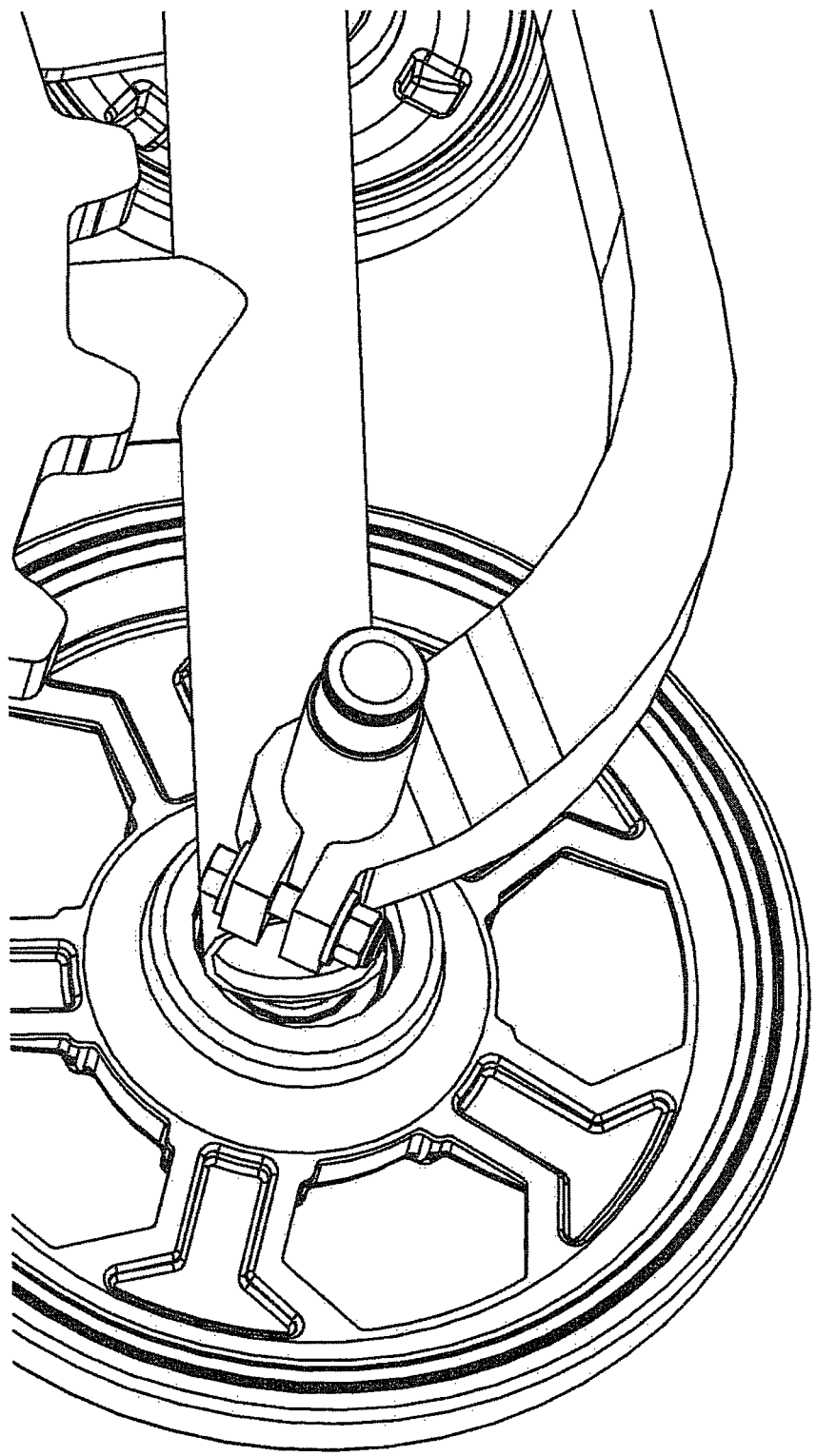
FIG. 10 is a fragmentary enlarged side perspective view of the track system comprising the guide rail of FIG. 9.

In the embodiment shown in FIGS. 9 and 10, the extremity of the guide rail 130C is configured as a mounting clamp 139C which is suitably sized and shaped to engage the axle 152C of the front (or rear) idler wheel 150C.

One of the advantages of mechanically mounting the guide rail to the support structure is that a broken guide rail can easily be replaced.

Figure 11:
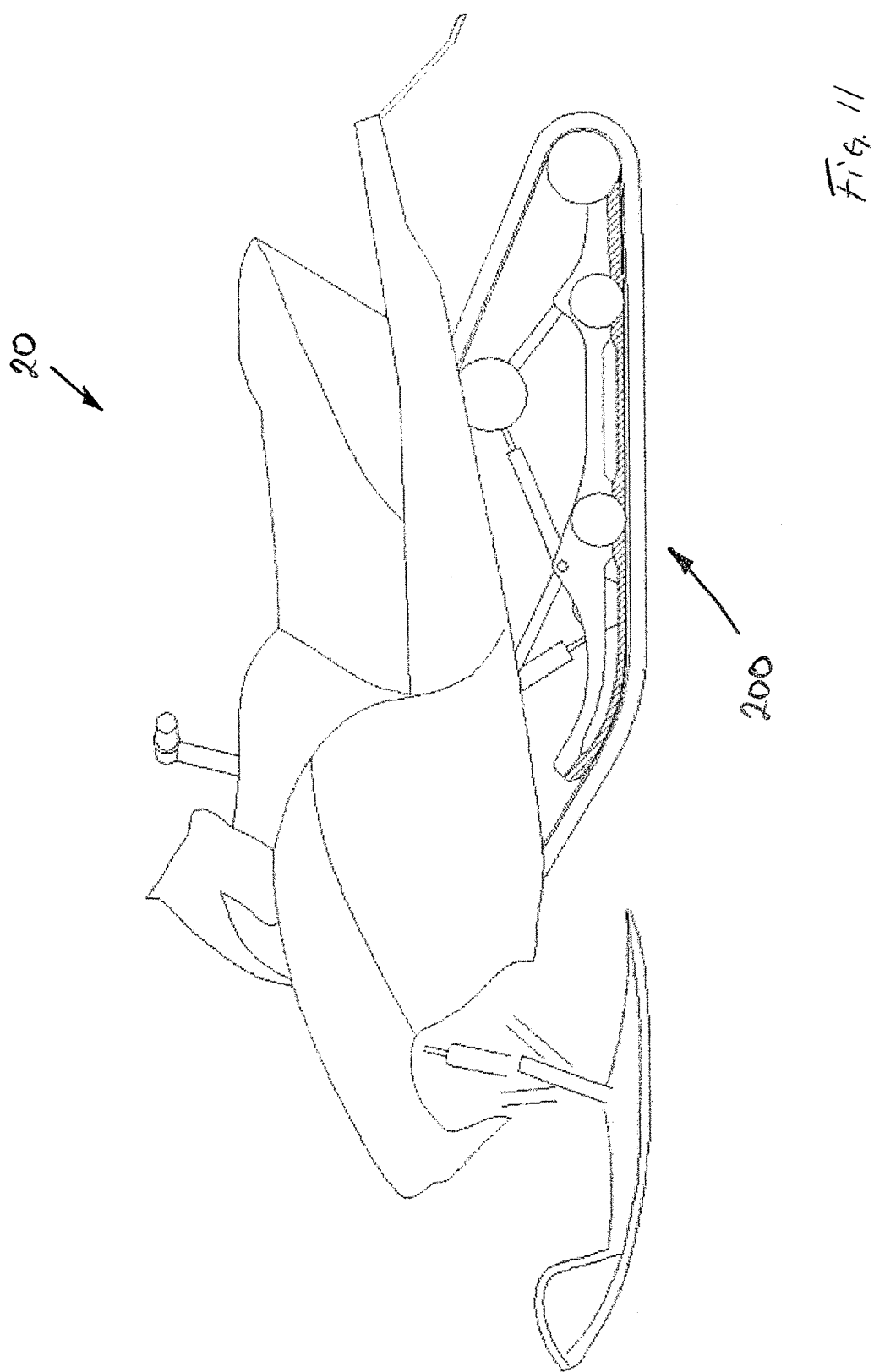
FIG. 11 is a side view of an exemplary snowmobile equipped with a track system comprising another embodiment of a guide rail in accordance with the principles of the present invention.
Figure 12:
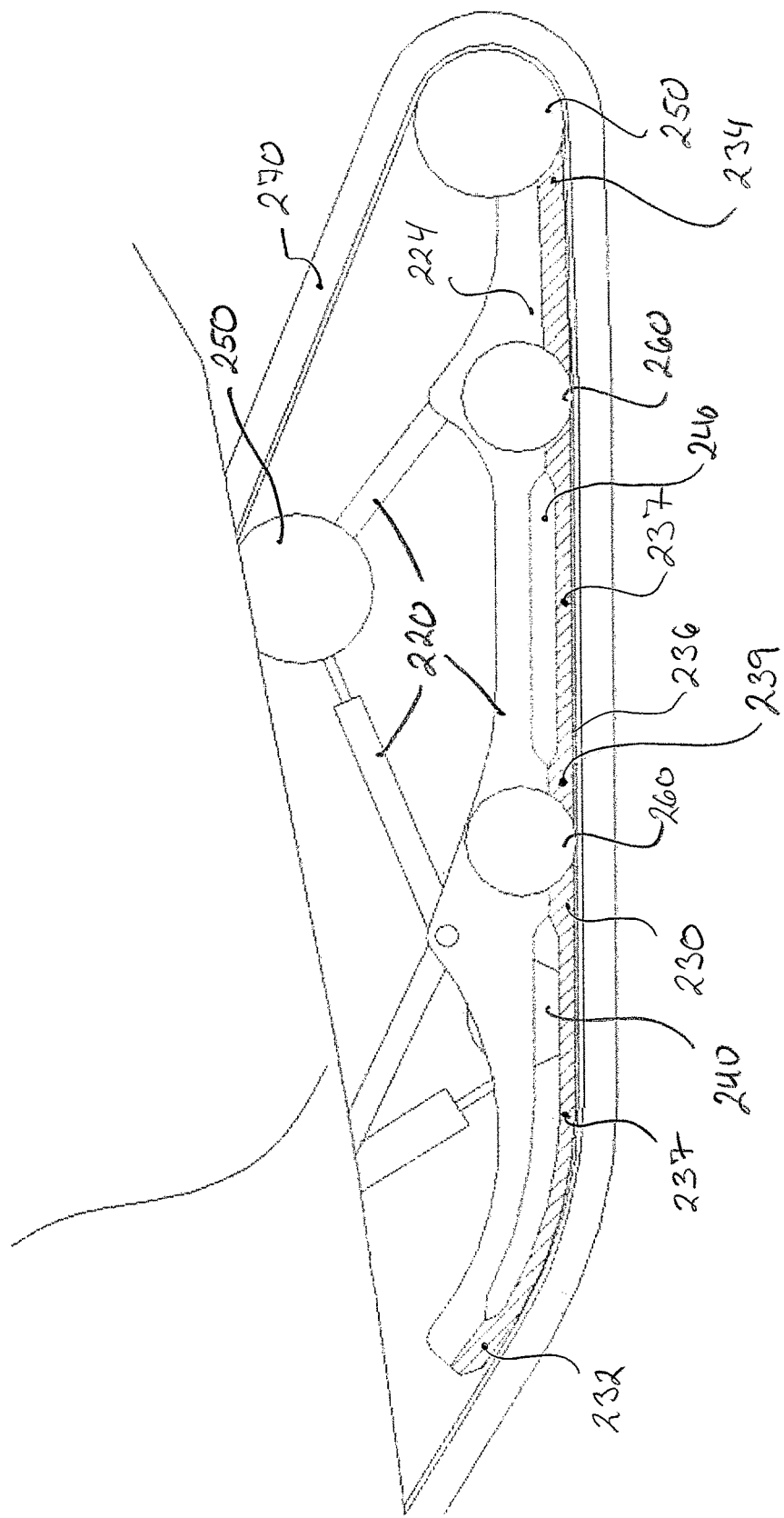
FIG. 12 is a side view of the track system of FIG. 11, the guide rail being in neutral position.

Referring now to FIG. 11, a snowmobile 20 is shown comprising a rear track system 200. Track system 200 is shown in greater details in FIG. 12.

Similar to track system 100, track system 200 comprises a drive wheel (not shown), a support structure 220 including one or more guide rails 230, idler wheels 250 and road wheels 260 pivotally mounted to the support structure 220, and an endless track 270 disposed about the wheels and guide rails 230.

In this embodiment, each guide rail 230 comprises a front portion 232, a rear portion 234, and a longitudinally extending middle portion 236.

Notably, in this embodiment, the middle portion 236 is not coextensive with the resilient deformable portion. In fact, the middle portion 236 comprises two resilient deformable portions 237 which are separated by a more rigid portion 239.

To allow the deformable portions 237 to deflect upwardly upon encountering a hard or immovable obstacle, spaces 240 are provided between the deformable portions 237 and the lower portion 224 of the support structure 220.

Understandably, in other embodiments, the middle portion 236 could comprise only one deformable portion 237 or more than two. Still, the number and length of the deformable portions 237 should be chosen such as to allow proper deflection of the portions 237 under impact. In that sense, if the deformable portion 237 is too long, it might be too flexible and fail to provide proper guiding support for the track 270 during normal operation of the snowmobile. Conversely, if the deformable portion 237 is too short, it might not be flexible enough and fail to deflect under impact.

Understandably, the deformable portions 237 of the guide 230 work in the same way as the deformable portion 136 of the guide rail 130. Upon encountering a hard or immovable obstacle, the deformable portions 237 will temporarily and resiliently deflect upwardly to at least partially absorb the impact caused by the obstacle.

Figure 14:
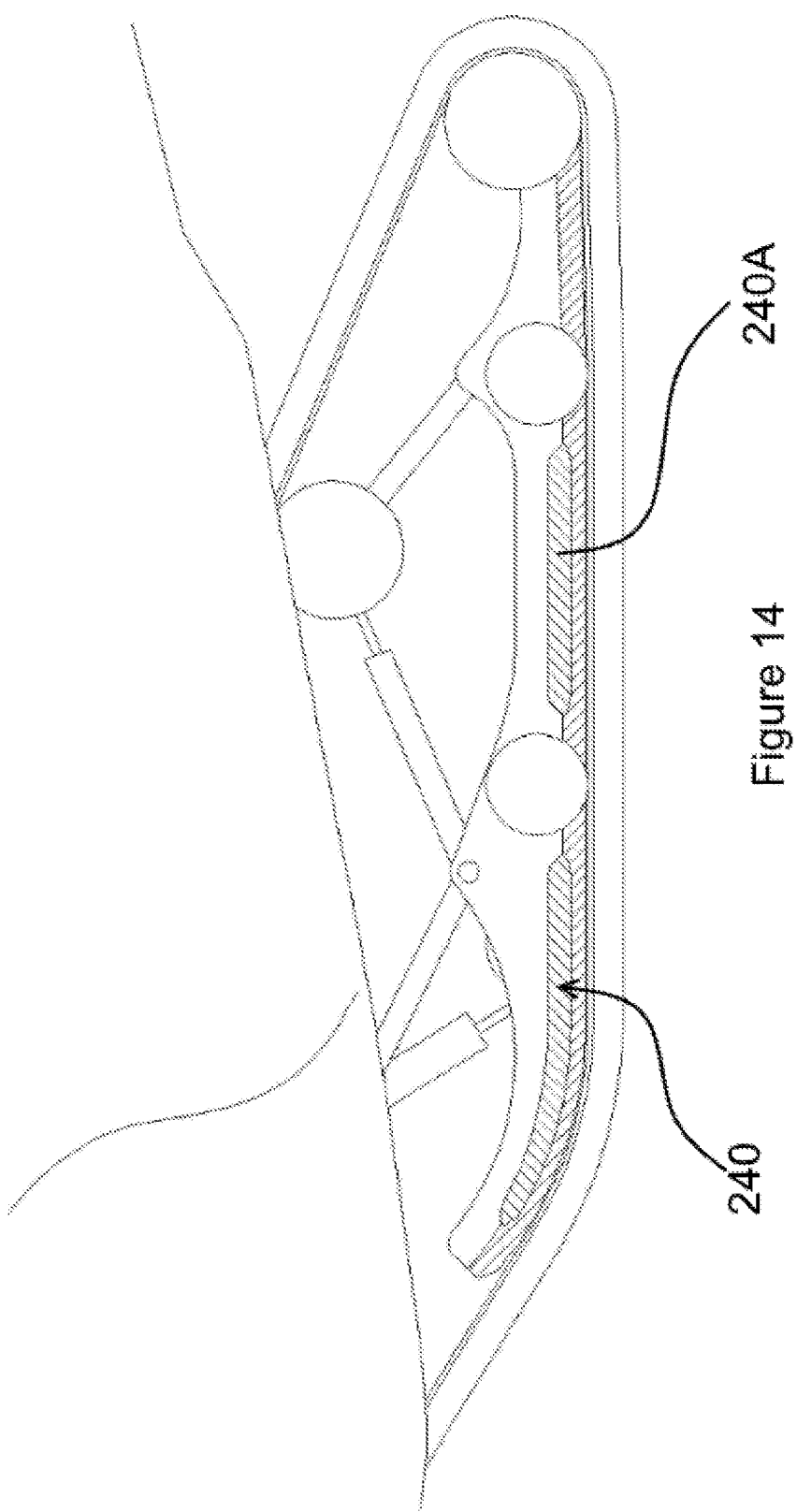
FIG. 14 is a side view of an exemplary snowmobile equipped with a track system comprising yet another embodiment of a guide rail in accordance with the present invention, the guide rail being in neutral position.

As mentioned above, in the present embodiment, the guide rail 230 is provided with spaces 240 above the deformable portions 237 to provide room for upward deflection thereof. In the present embodiment, the spaces 240 are empty. However, in other embodiments and as illustrated in FIG. 14, these spaces 240 could be partially or completely filled with a resilient material 240A such as elastomeric material or with a polymeric material such as polymeric foam. In such embodiments, the filling resilient material 240A could contribute to further absorb vibrations and shocks.

In other embodiments, the deformable portions 237 could be made of a different and generally more flexible material than the rest of the guide rail 230. In such embodiments, depending on the material of the deformable portions 237, the latter may or may not be made thinner than the rest of the guide rail 237.

Overall, for track systems used on recreational vehicles such as snowmobiles, ATVs, UTVs and SSVs, the vertical flexibility of the deformable portion or portions should generally be between about 200 and about 300 pounds per inch (lbs/in).

Still, by virtue of the vertical flexibility, the deformable portion is also likely to be flexible in the lateral direction. However, the deformable portion should be configured to be much less flexible in the lateral direction than in the vertical direction. For example, if the vertical flexibility is between about 200 and about 300 lbs/in, the lateral flexibility should be between about 750 and about 1250 lbs/in to prevent excessive lateral deformation or deflection of the deformable portion.

By at least partially absorbing some vibrations and shocks caused by hard and/or immovable obstacles, the deformable portions 136 and 237 contribute to reducing the transmission of vibrations and shocks to the vehicle 10, 20 and its operator.

As an additional benefit, the ability of the deformable portions 136 and 237 to temporarily deform can contribute to the reduction of friction between the guide rails 130/230 and the inner surface of the tracks 170/270. By reducing friction, the deformable portions 136 and 237 also contribute to reduce heat generation and wear on the guide rails 130/230 and on the inner surface of the track 170/270.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A track system comprising:
   a drive wheel;
   a support structure including a guide rail, the guide rail having at least one resilient deformable portion structured to temporarily deform with respect to a relief of the ground;
   a first set of idler wheels rotatably mounted to the support structure;
   a second set of idler wheels rotatably mounted to the support structure; and
   an endless track disposed about the wheels.

2. The track system as claimed in claim 1, wherein the resilient deformable portion is rigid enough to guide the endless track during normal operation of the track system and is flexible enough to temporarily and resiliently deform with respect to the relief of the ground.

3. The track system as claimed in claim 2, wherein the guide rail is generally located on a lower portion of the support structure in order to guide a lower run of the endless track.

4. The track system as claimed in claim 3, further comprising at least one support wheel pivotally mounted to the support structure.

5. The track system as claimed in claim 4, wherein the guide rail guides the lower run of the endless track in cooperation with the at least one support wheel.

6. The track system as claimed in claim 4, wherein the track system comprises at least two support wheels configured as a tandem, the guide rail guides the lower run of the endless track in cooperation with at least one of the tandem of support wheels.

7. The track system as claimed in claim 1, wherein the support structure includes at least one deflection space above the at least one resilient deformable portion.

8. The track system as claimed in claim 7, wherein the at least one deflection space is partially or completely filled with a resilient material.

9. The track system as claimed in claim 1, wherein the guide rail has at least one deflection space above the at least one resilient deformable portion.

10. The track system as claimed in claim 1, wherein the guide rail has at least two resilient deformable portions.

11. The track system as claimed in claim 10, wherein the resilient deformable portions are longitudinally spaced apart.

12. The track system as claimed in claim 1, wherein the at least one resilient deformable portion is made of material allowing deformation or deflection in a vertical direction.

13. The track system as claimed in claim 12, wherein a vertical flexibility of the at least one deformable portion is between about 200 and about 300 pounds per inch.

14. The track system as claimed in claim 12, wherein the at least one resilient deformable portion is made of material allowing deformation or deflection in a lateral direction and the at least one resilient deformable portion is more deformable or deflectable in the vertical direction than in the lateral direction.

15. The track system as claimed in claim 14, wherein the vertical flexibility of the at least one deformable portion is between about 200 and about 300 pounds per inch and wherein a lateral flexibility is between about 750 and about 1250 lbs/in.

16. The track system as claimed in claim 1, wherein the at least one resilient deformable portion is a thinner portion than a remainder of the guide rail.

17. A vehicle equipped with a track system, the vehicle having mounted thereto at least one track system as claimed in claim 1.

18. The track system as claim in claim 1, wherein the first set of idler wheels are front idler wheels and the second set of idler wheels are rear idler wheels.

19. The track system as claimed in claim 1, wherein the first set of idler wheels are upper idler wheels and the second set of idler wheels are rear idler wheels.

20. A guide rail for a track system support structure, the guide rail structured for mounting a drive wheel and at least one idler wheel thereto, the guide rail comprising at least one resilient deformable portion which temporarily deforms with respect to a relief of the ground.

21. The guide rail as claimed in claim 20, wherein the guide rail further comprises a front portion, a rear portion and a middle portion and wherein the middle portion is the resilient deformable portion.

22. The guide rail as claimed in claim 20, wherein the guide rail comprises at least two resilient deformable portions.

23. The guide rail as claimed in claim 20, wherein the deformable portion is made of thermoplastic polymers.

* * * * *